J. H. FARRELL.
COCKLE-SEPARATOR.

No. 175,277. Patented March 28, 1876.

Witnesses.
Aug. B. Stoughton Jr.
Edmund Masson

Inventor:
John H. Farrell
By atty A. B. Stoughton.

UNITED STATES PATENT OFFICE.

JOHN H. FARRELL, OF KNOXVILLE, TENNESSEE.

IMPROVEMENT IN COCKLE-SEPARATORS.

Specification forming part of Letters Patent No. 175,277, dated March 28, 1876; application filed March 31, 1875.

*To all whom it may concern:*

Be it known that I, JOHN H. FARRELL, of Knoxville, in the county of Knox and State of Tennessee, have invented certain new and useful Improvements in Cockle-Machines; and I do hereby declare the following to be a full, clear, and exact description of the same, reference being had to the accompanying drawings, making a part of this specification, in which—

Figure 1:
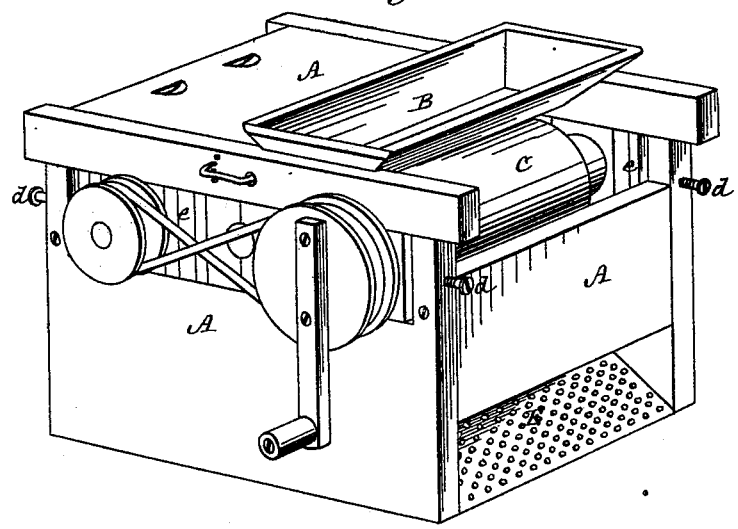
Figure 2:
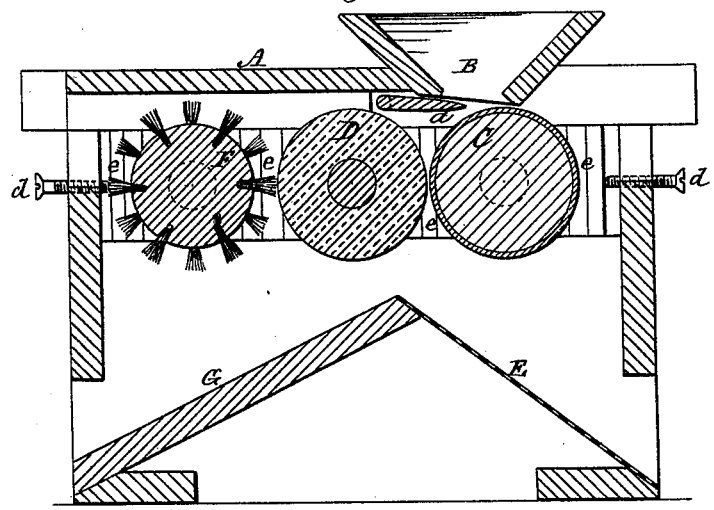
Figure 3:
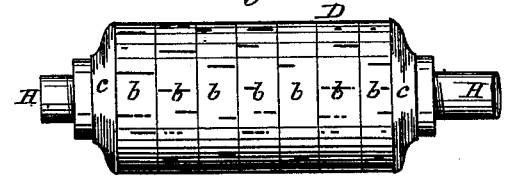

Figure 1 represents a perspective view of a machine in which my invention is embodied. Fig. 2 represents a vertical and longitudinal section through the same. Fig. 3 represents detached a cork-covered roller, which is the leading characteristic of my invention.

My invention relates to the combination of an iron or iron-covered cylinder with a cork or cork-surfaced cylinder, and an adjustable and yielding brush-cylinder for cleaning the cork cylinder, as will be explained.

The frame or case of the machine is shown at A, at the top of which there is a hopper, B, into which the seed that is to be cleaned or separated from the cockle is fed in, and $a$ is a valve-slide or regulator to define the feeding in of the seed.

Underneath the hopper B there is a pair of rolls, C D, of which that, C, is of metal, or covered with metal or some very hard substance, so that the seeds or cockle will not embed in its surface. The other roll of the pair—viz., that, D, is made of or covered with cork or similar vegetable or woody substance that has the properties of cork for this purpose. The rolls C D are turned toward each other, their peripheries not quite meeting, but nearly so, and they are driven by gears or belts, the latter being preferable, as the wear of the cork-surface must be compensated for by moving that roll toward the hard roll, or vice versa. The seeds passing through between the surfaces of the rolls C D fall upon a screen, E, where they are separated from extraneous matter, and thence pass out of the machine.

The cockle, however, is pressed by the roller C against and into the surface of the cork or cork-covered roll D, where it adheres and passes around with said roll D until it is met by the revolving brush F, which brushes it off or out of the cork-surface, when it drops upon the inclined board G, and out of the machine, at a point separate from that where the seeds pass out.

A convenient way of making the cork roll is shown at Fig. 3, where the cork is represented as made of a series of rings, $b$, through which a shaft, H, passes, and on which are screwed or otherwise fastened two heads, $c\ c$, for firmly and compactly holding the cork rings on said shaft. But the roller may be covered with sheet-cork, and answer a good purpose, but I prefer the rings, which may be several inches in depth between their perimeter and the shaft, and thus last for a long time, or until worn down to near the shaft, the roll C working within the heads $c\ c$.

The journals or bearings of the rolls, as also of the revolving brush, may be sustained in boxes, which are in turn restrained by rubber cushions $e$, so as to allow them to yield somewhat and relieve the machine of sudden jars or strains. And these boxes or bearings are made adjustable by set-screws, as at $d$.

I have shown but one pair of rolls and but one screen in the drawings. It is obvious that a second or third pair of rolls, like those C D, may be used, so that the seeds and cockle may, if found necessary, go through a second or third similar operation.

What I claim in a cockle-machine is—

In combination with an iron-surfaced pressing-roll, C, the cork-covered roll or cork roll D, and the brush-cylinder F, made adjustable and yielding, as at $d\ e$, as and for the purpose described and represented.

J. H. FARRELL.

Witnesses:
WILL. C. CHAMBERS,
C. H. LEFTWICH.